(12) United States Patent
Kadambe et al.

(10) Patent No.: US 9,749,339 B2
(45) Date of Patent: Aug. 29, 2017

(54) PROACTIVE EMERGING THREAT DETECTION

(71) Applicant: Raytheon Company, Waltham, MA (US)

(72) Inventors: Shubha Kadambe, Thousand Oaks, CA (US); Jason Slepicka, Long Beach, CA (US); Benjamin T. Wright, Manhattan Beach, CA (US); Kim A. Phan, Artesia, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/629,795

(22) Filed: Feb. 24, 2015

(65) Prior Publication Data

US 2016/0248787 A1    Aug. 25, 2016

(51) Int. Cl.
*G06F 11/00* (2006.01)
*H04L 29/06* (2006.01)
*G06N 7/00* (2006.01)

(52) U.S. Cl.
CPC ......... *H04L 63/1416* (2013.01); *G06N 7/005* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 8,844,041 | B1* | 9/2014 | Kienzle | H04L 41/12 709/224 |
| 2003/0051026 | A1* | 3/2003 | Carter | H04L 12/24 709/224 |
| 2003/0163729 | A1* | 8/2003 | Buchegger | H04L 12/2602 726/22 |
| 2007/0118909 | A1* | 5/2007 | Hertzog | G06F 21/552 726/23 |
| 2010/0205128 | A1 | 8/2010 | Nolan et al. | |
| 2011/0238603 | A1 | 9/2011 | Peoples et al. | |

OTHER PUBLICATIONS

"International Application Serial No, PCT/US2015/050371, International Search Report mailed Jun. 2, 2016", 4 pgs.
"International Application Serial No. PCT/US2015/050371, Written Opinion mailed Jun. 2, 2016", 7 pgs.

* cited by examiner

*Primary Examiner* — Trang Doan
(74) *Attorney, Agent, or Firm* — Schwegman Lundberg & Woessner, P.A.

(57) ABSTRACT

A system creates a dynamic stochastic network using data relating to events. The dynamic stochastic network includes super nodes, local nodes, and agents. Connections among the super nodes and local nodes include events that are related to the super nodes and the local nodes. Strengths of the connections between the super nodes and local nodes are a function of a number of events that are common to the super nodes and local nodes. The connections are made and broken as the agents interact over time. The strengths of the connections increase and decrease as a function of a change in the number of events that the super nodes and local nodes have in common. An instability metric is calculated for the dynamic stochastic network, and an emerging group threat behavior is detected based on a deviation from the instability metric.

20 Claims, 7 Drawing Sheets

PROACTIVE EMERGING THREAT DETECTION

GOVERNMENT RIGHTS

This invention was not made with United States Government support. The United States Government does not have any rights in this invention.

TECHNICAL FIELD

The present disclosure relates to a system and method for proactive emerging threat detection.

BACKGROUND

After an attack like the Boston Marathon bombing in 2013, analysts sift through vast amounts of data to understand what led up to the attack. From this intelligence, analysts suggest precautionary measures to prevent a similar attack from happening again. For the subsequent Boston Marathon in 2014, this meant security was put on the lookout for pressure cookers and unattended backpacks. The problem with this approach is that adversaries are creative and they improvise everyday. It is uncommon for attackers to repeat the same attack method. Instead, they use new methods. Consequently, behaviors are simply too varied to be able to train an expert system to account for each possibility. However, certain general behaviors leading up to an attack are common, such as planning and communication among the attackers. To prevent attacks from happening in the future, there is a need for a proactive real-time analysis tool that alerts operators to closely monitor emerging threats and stop the attack before it happens.

Prior attempts at dealing with such attacks consist of tools such as Raytheon's® Intersect Sentry™ and EarthBase™ or IBM's SPSS®. These tools are non-real time and only support offline forensic analysis. They do not have the capability to do proactive analysis in real-time. The underlying techniques currently used for predictive analytics are based on graphical networks and Bayes networks. These techniques capture the causal relationship in the form of conditional probabilities between the events. This requires events, event types, and the causal relationships to be pre-defined. This further necessitates having a domain expert capable of understanding the events and their causal relationships, and modeling these relationships mathematically. Once the models are defined, they need to be trained with copious amounts of data, which must be gathered ahead of time and must be representative of real life. Once the models are trained, they are fixed, which means they can only predict the events for which they are trained.

DETAILED DESCRIPTION

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

An embodiment is a tool to perform a non-template based proactive real-time analysis on behaviors that could possibly lead to an attack so that such behaviors can alert analysts to emerging threats before they become full-fledged attacks. The tool uses an event-based dynamic stochastic network of sparse super nodes and local dense nodes that are created as events occur. Emergent threat behavior detection is accomplished in real-time by computing the distance from the network's equilibrium. The tool does not suffer from the limitations of prior attempts outlined above because it is unsupervised and can adapt to new events without a domain expert or subject matter expert prescribing the new events ahead of time, does not require collection of training data, and can perform analyses in real time.

Figure 1:
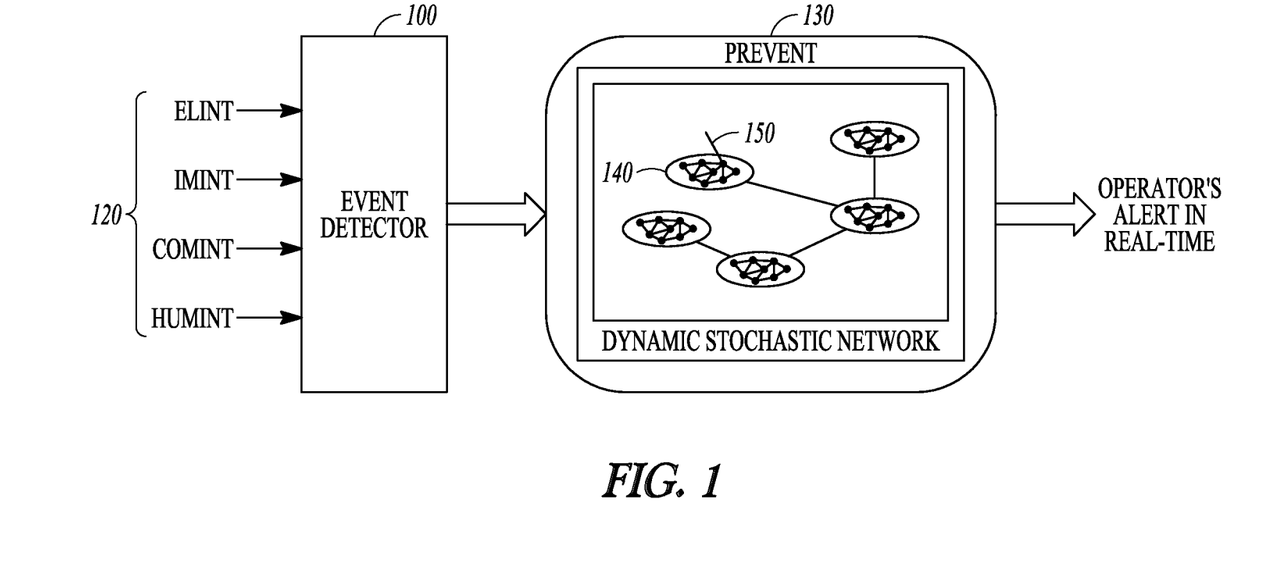
FIG. 1 is a diagram of a proactive emerging threat detection system.

FIG. 1 is a high level block diagram of a proactive emerging threat detection system. An event detector 100 receives input from intelligence gathering systems 120, such as electronic intelligence (ELINT), imagery intelligence (IMINT), communication intelligence (COMINT), geographical intelligence (GEOINT), and human intelligence (HUMINT). The system builds a dynamic stochastic network 130 in real time, which consists of sparsely connected super nodes 140 and densely connected local nodes 150 within each super node 140. The super nodes 140 represent events and agents (actors associated with certain events) of one type of intelligence data source, such as ELINT or COMINT. The sparse connectivity between super nodes 140 represents a relationship between the events and agents from one data source to the other. The local nodes 150 within a super node 140 represent agents, and connections (and thicknesses of the connections) between the local nodes 150 represent relationships (and the number of events that connect the two agents) between the agents. The relationships and connectivity between two local nodes 150 (agents) are established based on the common events associated with the agents. This network of super nodes 140 and local nodes 150 within the super nodes 140 is built dynamically as actors appear and disappear and events occur. Once in a while (e.g., could be at periodic time), an equilibrium vector of the networks is computed. For normal patterns of life, this equilibrium vector is close to zero. When there are sudden changes in the number of agents and/or events and the relationship between agents, then the computed equilibrium vector will tend to be away from zero. This is measured by computing the distance from a zero vector and the computed equilibrium vector. When this computed distance is above a certain threshold, the tool adaptively identifies anomalous behaviors in real time so that the tool can alert operators to closely monitor the potentially emerging threat and the actors associated with that threatening behavior.

The sparse super nodes 140 capture global or macroscopic behavior. The local dense nodes 150 within the super nodes 140 capture local microscopic behavior. Each local node 150 within a super node 140 is represented as a Poisson process. A local network is a super node 140 that is represented as a Markov jump process of nodes or agents associated with the super node 140. A global network is a set of super nodes 140 that is represented as a set of Markov jump processes that are associated with each super node 140 that is part of the global network.

The network equilibrium and deviation from the equilibrium are determined as follows. A super node i in a local network consists of event types or classes $\{c_1, c_2, \ldots, c_K\}$ and a number of active agents or nodes N at a given time. The super node i also consists of the number of active events of different classes handled by agents or nodes at a given time t: $\chi = \{(n_1, n_2, \ldots, n_K)\}$. The super node i further consists of a node or agent l's stochastic process that is represented at time t as: $X_{i,l}^N = \{\lambda_{i,k,l}, \mu_{i,k,l}, [\gamma_{i,l,1}, \gamma_{i,l,2}, \ldots, \gamma_{i,l,N}]\}$, where $\lambda_{i,k,l}$ is the probability of class k events entering the super node i at agent l, $\mu_{i,k,l}$ is the duration of class k events in super node i being associated with an agent l, and $\gamma_{i,l,j}$ is the probability of a relationship between agents l and j associated by the events related to them in super node i. The super node i's stochastic process is represented as:

$$Y_i^N(t) = (Y_{i,n}^N(t), n \in \chi) \text{ and } Y_{i,n}^N(t) = \frac{1}{N}\sum_{l=1}^{N} 1_{x_{i,l}^N(t)=n},$$

where $\|$ is an indicator function which is defined as:

$$1_A(x) := \begin{cases} 1 & \text{if } x \in A, \\ 0 & \text{if } x \notin A. \end{cases}$$

A global network consists of M super nodes and its stochastic process at time t is represented as: $Y^N(t) = \{Y_1^N(t), \ldots, Y_M^N(t)\}$. A histogram of events that are associated with the super node i is created. The histogram and the probabilities for a super node can be generated and calculated as follows.

Node level summaries are created at each node by summarizing events by type since a last histogram, and updating a total history. At the global level, an equilibrium is calculated at each super node, for each node configuration (the number of operations associated with this computation is: $[O(M^*X^*K)])$.

Using the histogram, the following probability is calculated:

$$\lambda_{i,k,l} = \frac{num \text{ of events of type } 1 \ldots K \text{ associated with agent } l}{\text{total number of events of type } 1 \ldots K \text{ associated with all the active agents in super node } i}.$$

The duration of an event type k is as follows:

$$\mu_{i,k,l} = \frac{\text{duration of events of type } k \text{ associated with agent } l}{\text{total duration of events of type } 1 \ldots K \text{ associated with all the active agents in super node } i}.$$

The probability of relationship between agents l and j associated by the events related to them in super node i—$\gamma_{i,l,j}$ can by computed by creating another histogram as described above.

Using a similar histogram approach, the probability of connection or relationship between two super nodes i and l $\gamma^{il}$ in connection with related events can be computed as follows:

$$\gamma^{il} = \frac{\text{number of interactions between supe node } i \text{ and } l}{\text{total number interactions among all active super nodes}}.$$

Now, to detect emergent behavior so as to know when to alert an operator, based on the events in each database or intelligence source, local networks are instantiated by creating agents in connection with different types of event classes (i.e., one agent for one type of event), $\lambda_{i,k,l}$ is computed for all the active agents, $\mu_{i,k,l}$ is computed for all the active agents, and $\gamma_{i,l,j}$ is computed based on the number of interactions between all active agents l and j related to their associated events. Then, if the events of one super node relate to some events in other super nodes, the probability $\gamma^{il}$ of the relationship between those super nodes is computed.

Next, once in every T time steps (e.g., 5 or 10 times) the equilibria of the generated network is computed using the following:

$$f(\cdot) = \lfloor f_{i,n}(\cdot), i \leq M, n \in \chi \rfloor \text{ where } f_{i,n}(\cdot) \text{ is}$$

$$f_{i,n}(y) = \sum_{k=1}^{K}\left[\lambda_{i,k} + \gamma_{i,k}\sum_{m \in \chi} m_k y_{i,m} + \sum_{j \neq i}\gamma_k^{j,i}\sum_{m \in \chi} m_k y_{j,m}\right]$$

$$\lfloor y_{i,n-e_k} \| (n_k \geq 1) - y_{i,n} \|(n + e_k \in \chi) \rfloor +$$

$$\sum_{k=1}^{K}\left[\gamma_{i,k} + \mu_{i,k} + \sum_{j \neq i}\gamma_k^{i,j}\right][(n_k + 1)y_{i,n+e_k} \|(n + e_k \in \chi) - (n_k)y_{i,n}]$$

In the above computation of the equilibria of the generated network, $e_k$ denotes the kth unit vector, with 1 at the kth component and zero elsewhere. The notation $m+e_k$ denotes the configuration obtained by incrementing $n_k$ by one. This equilibrium vector should be close to zero. Thereafter, the system looks for a transition from one equilibrium to another when agents, an event or a set of events associated with them are included or excluded from the network. Any sharp deviation from the equilibrium vector close to 0 should indicate possible threatening behavior. This deviation can signal that an operator should be alerted.

The deviation can be calculated via an Equilibrium Stability Index. The Equilibrium Stability Index is calculated by taking an exponential moving average of the absolute value of the percent change in the magnitude of the equilibrium vector as follows.

$$ESI_t = \alpha * \left|\frac{E_t - E_{t-1}}{E_{t-1}}\right| + (1 - \alpha) * ESI_{t-1}.$$

In the above equation, $ESI_t$ is the Equilibrium Stability Index at time t, and $E_t$ is the magnitude of the equilibrium vector $f(\cdot) = \lfloor f_{i,n}(\cdot), i \leq M, n \in \chi \rfloor$ a time t. The coefficient $\alpha$ represents the degree of weighting the past, and is a constant smoothing factor between 0 and 1. A higher $\alpha$ discounts older observations faster. Detections are observed when the ESI exceeds a threshold value (e.g., can be set at 0.1 with a sampling rate of 5 seconds for a scenario). $E_t$ is the magnitude of network equilibrium. The instability metric is the thresholded ESI which is computed using $E_t$ using the above equation.

Figure 2A:
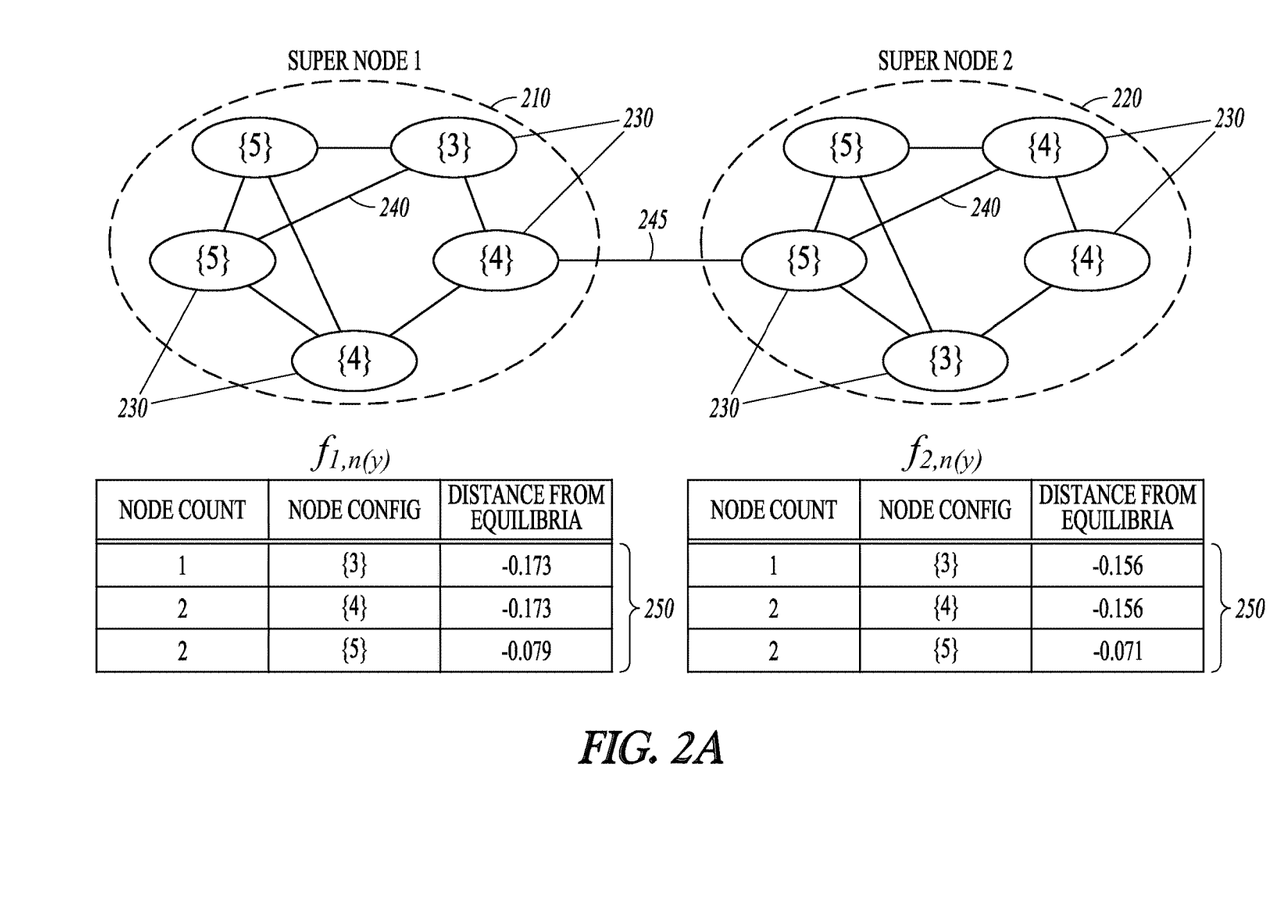
FIG. 2A is an example diagram of super nodes and local nodes in a proactive emerging threat detection system.
Figure 2B:
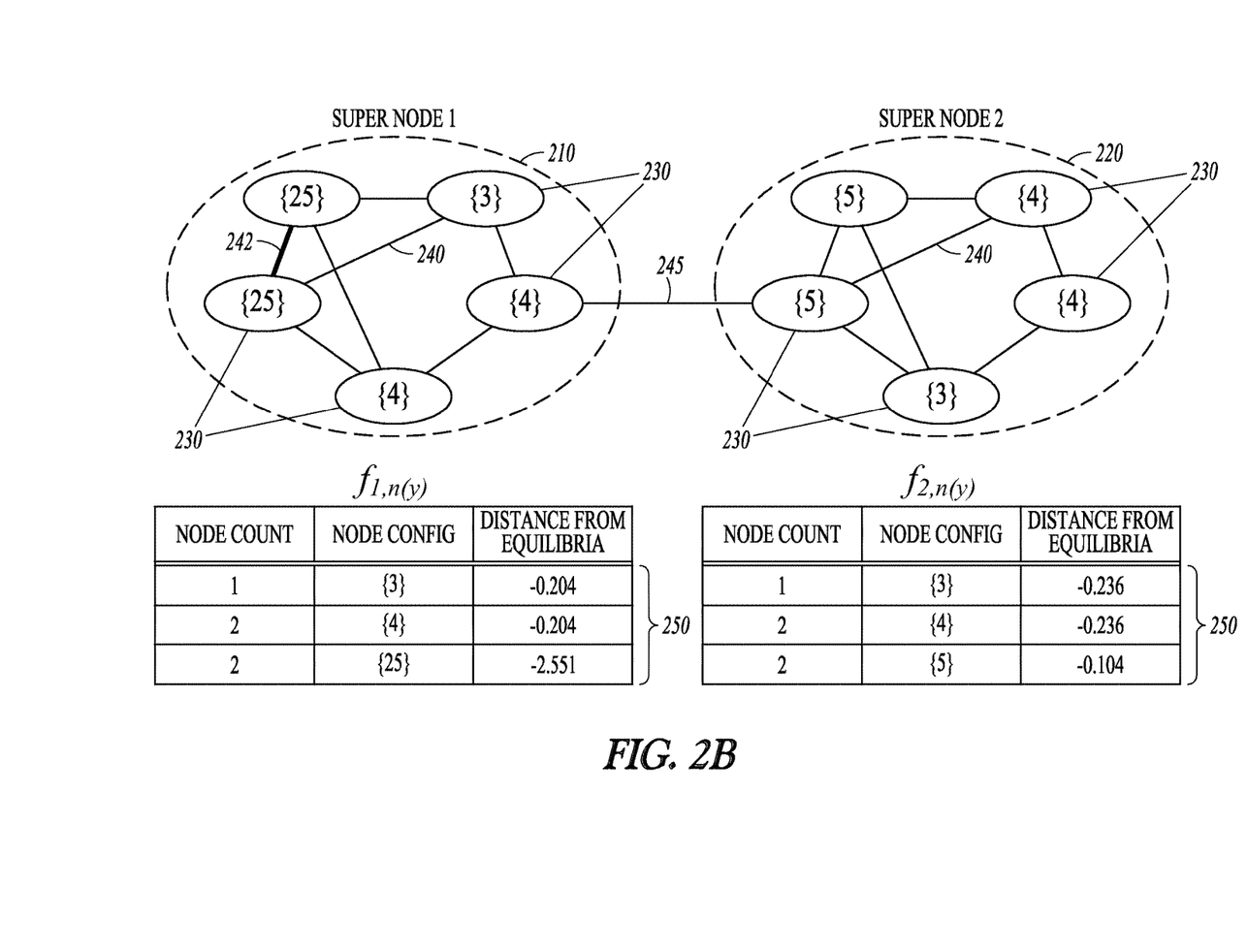
FIG. 2B is another example diagram of super nodes and local nodes in a proactive emerging threat detection system.
Figure 3:
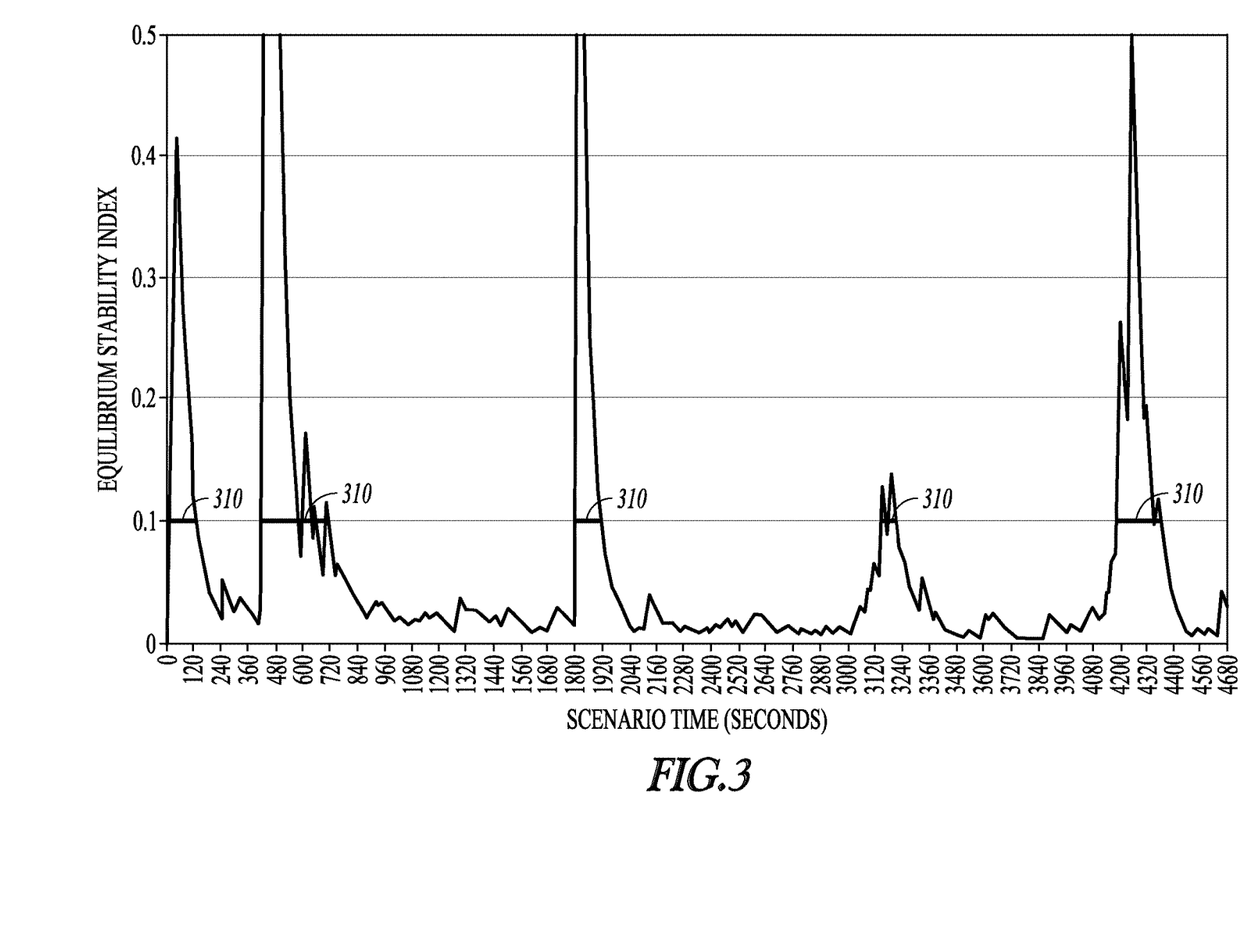
FIG. 3 is a graph illustrating detections of events in a proactive emerging threat detection system.

FIGS. 2A and 2B are example diagrams of super nodes and local nodes in a proactive emerging threat detection system and illustrate the Equilibrium Stability Index and distances from the equilibrium. In FIGS. 2A and 2B, super nodes 210 and 220 each include several local nodes 230. The local nodes within a super node are connected by connections 240, and one local node in the super node 210 is connected to another local node in the super node 220 via connection 245. In FIG. 2B, the bold connection 242 indicates that there are several events in common between the two connected local nodes 230. As noted above, the local nodes 230 represent agents, and the number within the local nodes 230 represent the node configuration, that is, the number of active events for each agent by class of the events. FIG. 2A illustrates computed equilibrium 250 for each of the super nodes 210 and 220, and FIG. 2B illustrates how the equilibriums have become larger, which may indicate that an alert should be generated. FIG. 3 further illustrates a threshold of 0.1, and detections 310 of unusual events that should be reported to an operator. The threshold represents $ESI_t$ above some value. In this example, it is 0.1. It can be chosen empirically; it can be chosen for some fixed probability of detection.

Figure 4A:
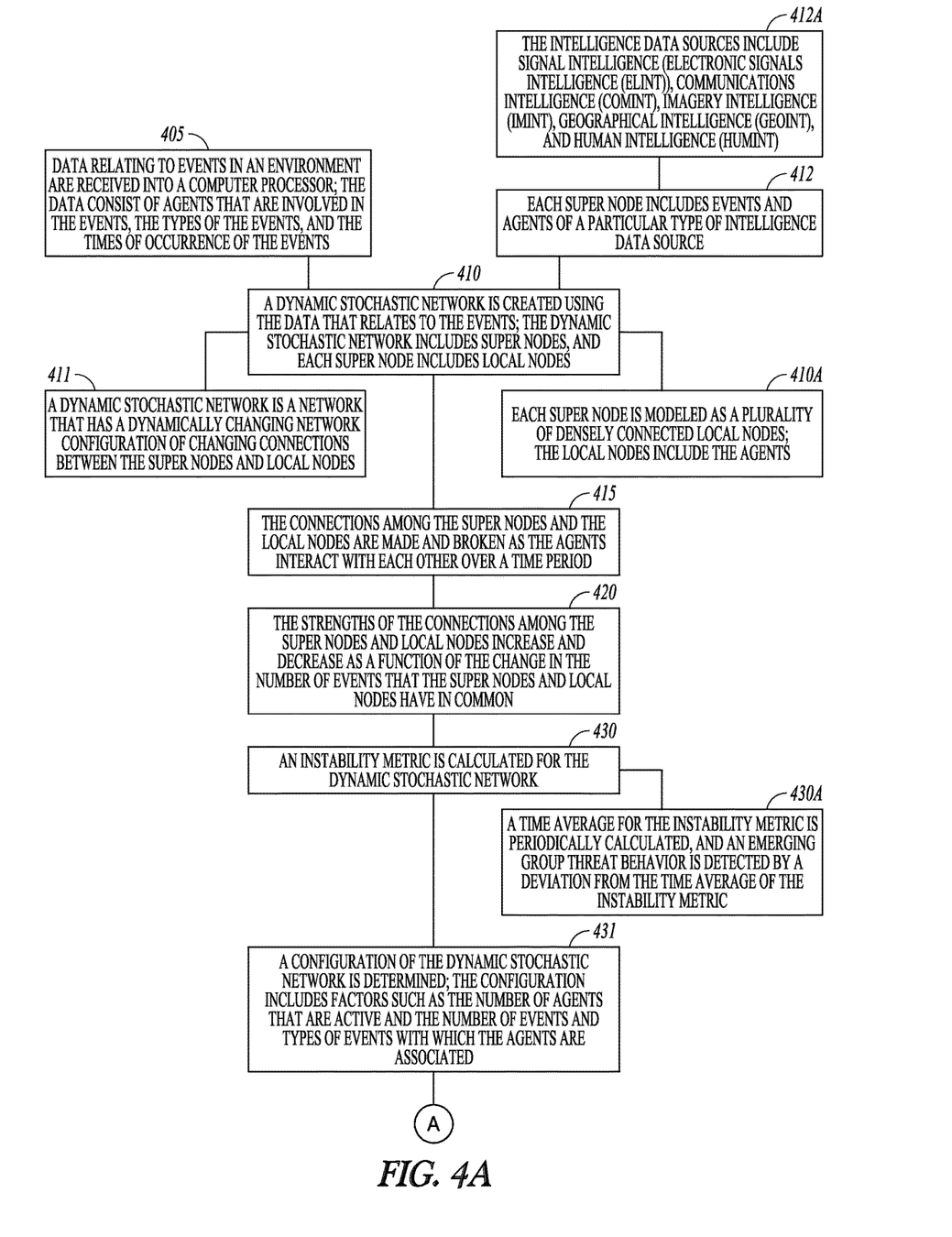
FIGS. 4A and 4B are a block diagram illustrating features and operations of a proactive emerging threat detection system.
Figure 4B:
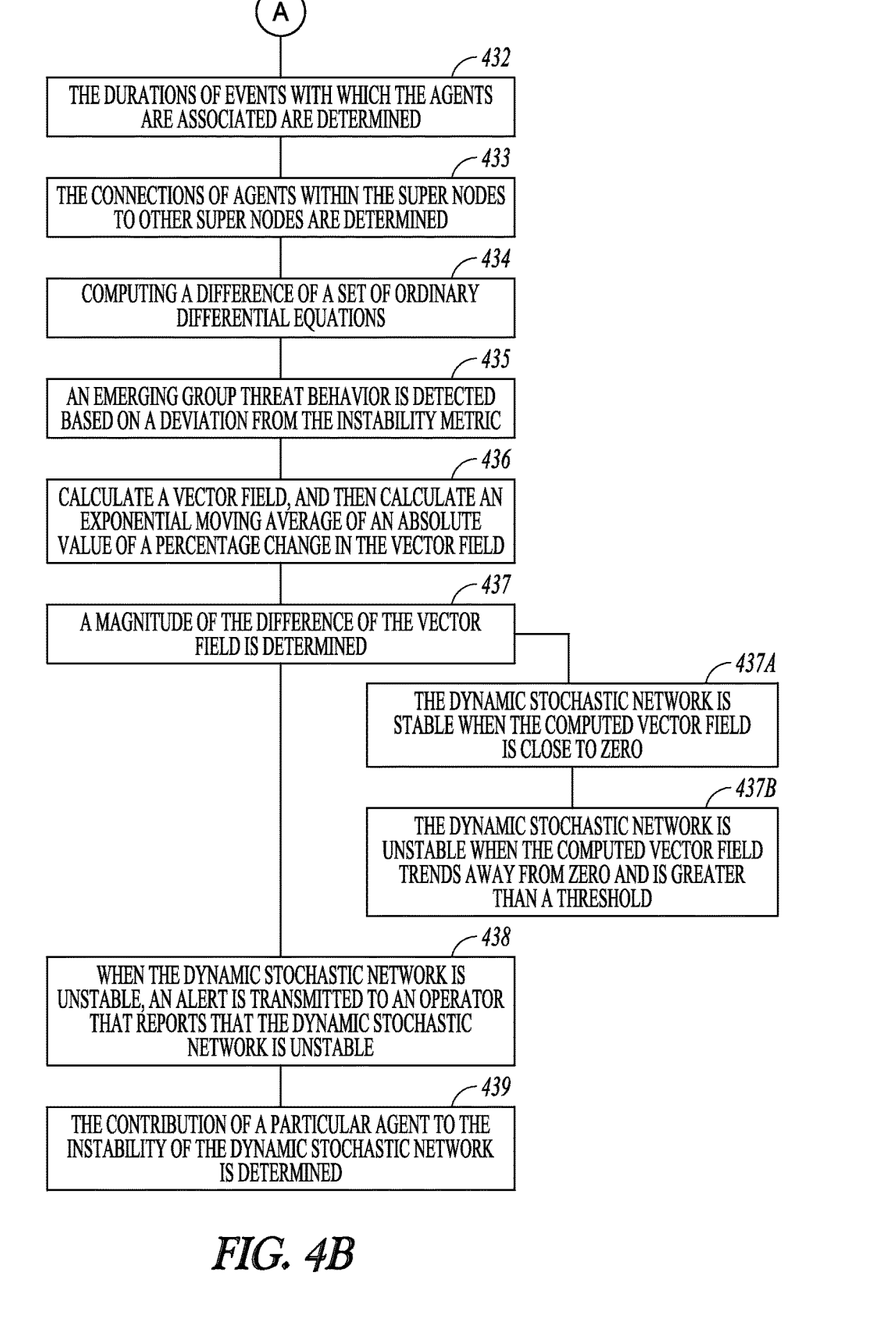

FIGS. 4A and 4B are a block diagram illustrating steps and features of a proactive emerging threat detection system. FIGS. 4A and 4B include a number of process blocks 405-439. Though arranged serially in the example of FIGS. 4A and 4B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 4A and 4B, at 405, data relating to events in an environment are received into a computer processor. The data consist of agents that are involved in the events, the types of the events, and the times of occurrence of the events. An identifying name or number can be assigned to each of the identified agents.

At 410, a dynamic stochastic network is created using the data that relates to the events. The dynamic stochastic network includes super nodes, and each super node includes local nodes. Specifically, as indicated at 410A, each super node is modeled as a plurality of densely connected local nodes. The local nodes include the agents. The dynamic stochastic network also includes connections among the super nodes and the local nodes. The connections include events that are related to the super nodes and the local nodes, and in particular, a connection between a first specific local node and a second specific local node that includes events that are common to the first and second specific local nodes. The strengths of the connections between the super nodes and local nodes (and particular first and second local nodes) are a function of a number of events that are common to the super nodes and local nodes (and the particular first and second local nodes). Block 411 illustrates that a dynamic stochastic network means that the network has a dynamically changing network configuration, which further means changing connections between the super nodes and local nodes (breaking connections, making connections, increasing the strength of connections, and decreasing the strengths of connections). Block 412 discloses that each super node includes events and agents of a particular type of intelligence data source, and block 412A discloses that the intelligence data sources can include signal intelligence (electronic signals intelligence (ELINT)), communications intelligence (COMINT), imagery intelligence (IMINT), geographical intelligence (GEOINT), and human intelligence (HUMINT).

At 415, the connections among the super nodes and the local nodes are made and broken as the agents interact with each other over a time period. For example, if two agents are traveling in close proximity on the same road, a connection may be established between the local nodes of those two agents. Thereafter, if one of the agents turns off the road and the other agent continues on the road, the connection between the two local nodes of those two agents may be broken. Consequently, as illustrated at 420, the strengths of the connections among the super nodes and local nodes (and particular first and second local nodes) increase and decrease as a function of the change in the number of events that the super nodes and local nodes have in common.

At 430, an instability metric is calculated for the dynamic stochastic network. At 430A, an exponential moving average of the absolute value of the percent change in the magnitude of the equilibrium vector for the instability metric is calculated once in a while (it could be at some fixed time step—periodically), and the emerging group threat behavior is detected by a deviation from the exponential moving average of the instability metric.

Operations 431-439 illustrate a method of calculating the instability metric. Beginning at 431, a configuration of the dynamic stochastic network is determined. The configuration can include factors such as the number of agents that are active and the number of events and types of events with which the agents are associated. At 432, the durations of events with which the agents are associated are determined, and at 433, the connections of agents within the super nodes to other super nodes are determined. This specifically involves connections of a first local node in a first super node to a second local node that is within a second super node.

The calculation of the instability metric further includes at 434 computing a difference of a set of ordinary differential equations i.e., gradient. The differential equations approximate an empirical distribution of the dynamic stochastic network and correspond to a computed vector field. At 435, an emerging group threat behavior is detected based on a deviation from the instability metric. This involves, as indicated at 436, first calculating a vector field, and then calculating an exponential moving average of an absolute value of a percentage change in the vector field. Specifically, at 437, a magnitude of the difference of the vector field is determined. Then, it is noted at 437A that the dynamic stochastic network is stable when the computed vector field is close to zero, and at 437B that the dynamic stochastic network is unstable when the computed vector field trends away from zero and is greater than a threshold. The threshold can be selected by an operator based on prior experience and the desired sensitivity of the system. At 438, when the dynamic stochastic network is unstable, an alert is transmitted to an operator that reports that the dynamic stochastic network is unstable. At 439, the contribution of a particular agent to the instability of the dynamic stochastic network is determined. The alert conveys that suspicious group behavior has been identified and that particular agents that contributed significantly to the instability of the dynamic stochastic network should be monitored more closely.

The proactive emerging threat detection system can be used in many different environments. For example, it can be used in a large body of water such as a sea. The sea may contain fishing areas and two shipping lanes, one for eastbound ships and one for westbound ships. The vessels within shipping lanes and other parts of the sea can include cargo ships, fishing boats, pleasure craft, fast boats, and military vessels.

Data that could be collected from this environment could include the observations that cargo vessels are navigating the sea via one of the two shipping lanes, that there are four groups of approximately ten fishing boats, that a military vessel is moving through a shipping lane and steaming faster than the cargo ships, and that there are several fast boats potentially manned by adversaries. The intelligence data could then indicate that groups of fast boats enter each fishing area and stop among the fishing boats, and after some time, the fast boats set an intercept course for the military vessel. This data could have been generated by tracks using radar sensor data. This intelligence data could then be provided to the above-described proactive emerging threat detection system, and the system will identify the anomalous activity of the fast boats setting an intercept for the military vessel. Example events in this shipping lane example include proximity of the boats and vessels, heading changes, shipping lane entries and exits, excessive speed or very slow speed, acceleration or deceleration, and stops, starts, and other movements.

An embodiment can include an error analysis methodology. In the error analysis, each detection of an event represents a time span of importance that is noted by the proactive emerging detection system. For example, the time span can range from 400 seconds to 520 seconds. The error analysis includes some tunable parameters, such as an Equilibrium Point Sampling Rate (inverse with alpha), an Exponential Moving Average alpha value (inverse with sampling rate), and a Detection Threshold. For the example above of the boats and vessels in a sea or strait, the parameters could be set to a five second sampling rate, a 0.1 alpha, and a 10% threshold.

Errors are introduced by having a fixed probability rate of any given event being missed. For example, if the error rate is 5%, then for each event in the scenario, there is a 5% chance that the event is missed and not included in the system calculations. In an embodiment, one hundred iterations should be run to ensure a fair sampling of varied missing event data. Detection matches between two system runs are determined by checking the center of the detection matches within 60 seconds of the baseline (no error) results (i.e., 460 s+/−60 s). Correct matches are determined by the number of detections in the baseline that matches with one or more results in the test. Missed detections are determined by the number of detections in the baseline that were not detected in any results in the test. False alarms are determined by the number of detections in the test that were not in any results in the baseline.

Figure 5:
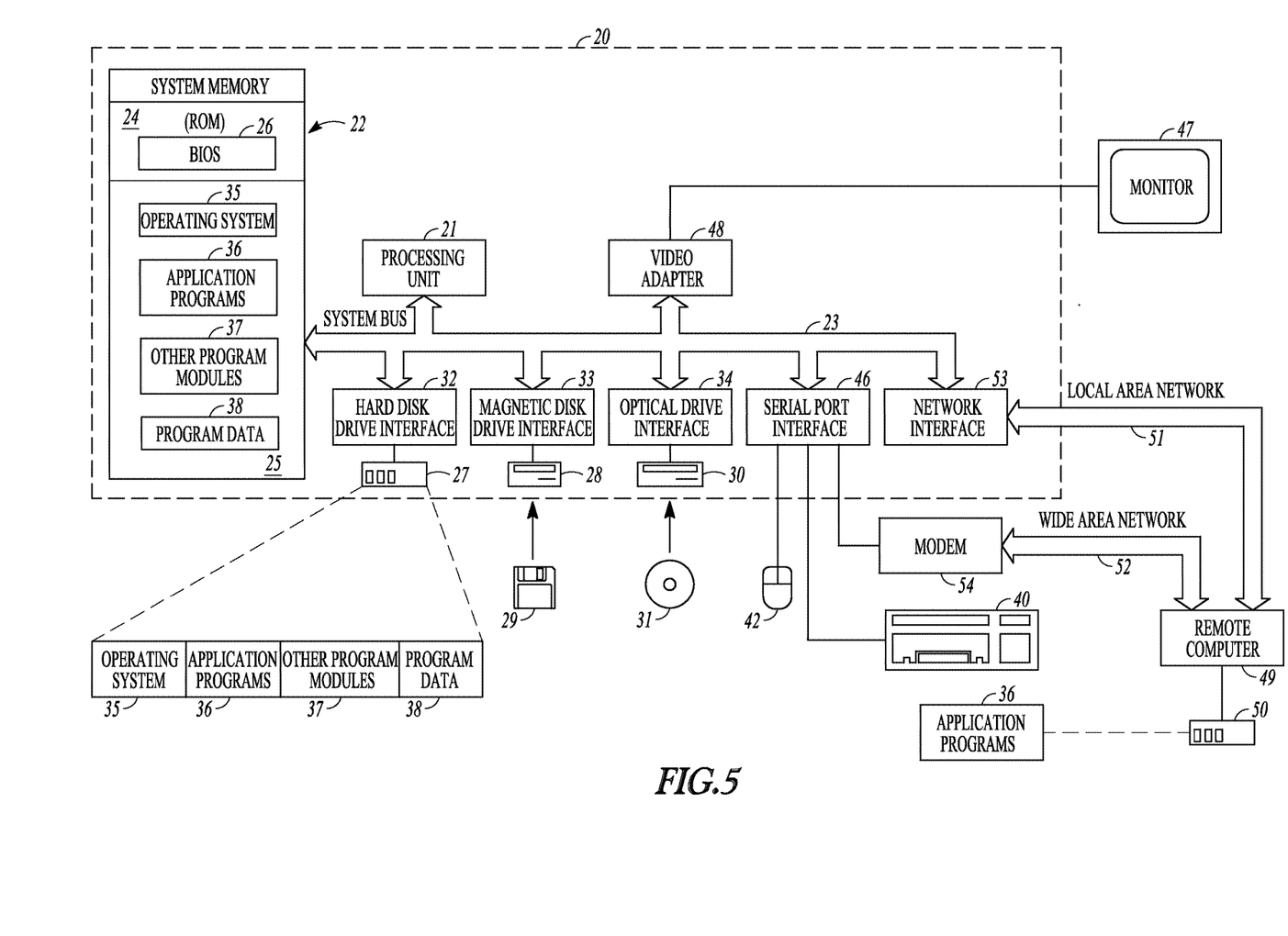
FIG. 5 is a block diagram of a computer system upon which one or more embodiments of a proactive emerging threat detection system can execute.

FIG. 5 is an overview diagram of hardware and an operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process comprising:
   receiving data relating to events in an environment, the data comprising agents involved in the events, types of the events, and times of occurrence of the events;
   creating a dynamic stochastic network in non-template based proactive real time using the data relating to the events in an artificially intelligent, unsupervised mode without use of a human subject matter expert, the dynamic stochastic network comprising super nodes, each super node comprising local nodes, and the local nodes comprising the agents; wherein the dynamic stochastic network comprises connections among the super nodes and the local nodes, the connections comprising events that are related to the super nodes and the local nodes; and wherein strengths of the connections between the super nodes and local nodes are a function of a number of events that are common to the super nodes and local nodes;
   making and breaking the connections among the super nodes and the local nodes as the agents interact over a time period;
   increasing and decreasing strengths of the connections among the super nodes and local nodes as a function of a change in the number of events that the super nodes and local nodes have in common;
   periodically calculating an instability metric for the dynamic stochastic network; and
   detecting in proactive real time an emerging group threat behavior based on a deviation from the instability metric;
   wherein the emerging group threat behavior is detected in real time by computing a distance from an equilibrium vector of the stochastic network.

2. The process of claim 1, comprising periodically calculating an exponential moving average for the instability metric; and detecting the emerging group threat behavior by detecting a deviation from the exponential moving average of the instability metric.

3. The process of claim 1, wherein the dynamic stochastic network comprises a dynamically changing network configuration.

4. The process of claim 1, wherein each super node comprises events and agents of a particular type of intelligence data source.

5. The process of claim 4, wherein the intelligence data source comprises one or more of signal intelligence comprising electronic signals intelligence (ELINT), communications intelligence (COMINT), imagery intelligence (IMINT), geographical intelligence (GEOINT), and human intelligence (HUMINT).

6. The process of claim 1, wherein each super node is modeled as a plurality of densely connected local nodes.

7. The process of claim 1, wherein the calculating the instability metric comprises:
   determining a configuration of the dynamic stochastic network; wherein the configuration comprises a number of agents that are active and a number of number of events and types of events with which the agents are associated;

determining durations of events with which the agents are associated; and determining connections of agents within the super nodes to other super nodes.

8. The process of claim 7, comprising:

computing a difference of a set of ordinary differential equations that approximates an empirical distribution of the dynamic stochastic network and that corresponds to a computed vector field.

9. The process of claim 8, comprising:

determining a magnitude of the difference of the vector field;

determining that the dynamic stochastic network is stable when the computed vector field is close to zero;

determining that the dynamic stochastic network is unstable when the computed vector field trends away from zero and is greater than a threshold; and when the dynamic stochastic network is unstable, transmitting an alert reporting that the dynamic stochastic network is unstable.

10. The process of claim 9, comprising determining a contribution of a particular agent to the instability of the dynamic stochastic network.

11. The process of claim 1, wherein the calculation of the instability metric comprises a calculation of an equilibrium stability index, comprising:

calculating a vector field; and calculating an exponential moving average of an absolute value of a percentage change in the vector field.

12. The process of claim 1, wherein the dynamic stochastic network comprises connectivity among the super nodes and the connectivity among the super nodes comprises relationships between the events and agents among different sources of intelligence data.

13. A system comprising:

a hardware computer processor configured for:

receiving data relating to events in an environment, the data comprising agents involved in the events, types of the events, and times of occurrence of the events;

creating a dynamic stochastic network in non-template based proactive real time using the data relating to the events in an artificially intelligent, unsupervised mode without use of a human subject matter expert, the dynamic stochastic network comprising super nodes, each super node comprising local nodes, and the local nodes comprising the agents; wherein the dynamic stochastic network comprises connections among the super nodes and the local nodes, the connections comprising events that are related to the super nodes and the local nodes; and wherein strengths of the connections between the super nodes and local nodes are a function of a number of events that are common to the super nodes and local nodes;

making and breaking the connections among the super nodes and the local nodes as the agents interact over a time period;

increasing and decreasing strengths of the connections among the super nodes and local nodes as a function of a change in the number of events that the super nodes and local nodes have in common;

periodically calculating an instability metric for the dynamic stochastic network; and detecting in proactive real time an emerging group threat behavior in real time based on a deviation from the instability metric;

wherein the emerging group threat behavior is detected in real time by computing a distance from an equilibrium vector of the stochastic network.

14. The system of claim 13, wherein the hardware computer processor is configured for periodically calculating an exponential moving average for the instability metric; and detecting the emerging group threat behavior by detecting a deviation from the exponential moving average of the instability metric.

15. The system of claim 13, wherein the hardware computer processor is configured to calculate the instability metric by:

determining a configuration of the dynamic stochastic network; wherein the configuration comprises a number of agents that are active and a number of number of events and types of events with which the agents are associated;

determining durations of events with which the agents are associated; and determining connections of agents within the super nodes to other super nodes.

16. The system of claim 15, wherein the hardware computer processor is configured for:

computing a difference of a set of ordinary differential equations that approximates an empirical distribution of the dynamic stochastic network and that corresponds to a computed vector field;

determining a magnitude of the difference of the vector field;

determining that the dynamic stochastic network is stable when the computed vector field is close to zero;

determining that the dynamic stochastic network is unstable when the computed vector field trends away from zero and is greater than a threshold;

when the dynamic stochastic network is unstable, transmitting an alert reporting that the dynamic stochastic network is unstable; and determining a contribution of a particular agent to the instability of the dynamic stochastic network.

17. A computer readable storage device comprising instructions that when executed by a processor execute a process comprising:

receiving data relating to events in an environment, the data comprising agents involved in the events, types of the events, and times of occurrence of the events;

creating a dynamic stochastic network in non-template based proactive real time using the data relating to the events in an artificially intelligent, unsupervised mode without use of a human subject matter expert, the dynamic stochastic network comprising super nodes, each super node comprising local nodes, and the local nodes comprising the agents; wherein the dynamic stochastic network comprises connections among the super nodes and the local nodes, the connections comprising events that are related to the super nodes and the local nodes; and wherein strengths of the connections between the super nodes and local nodes are a function of a number of events that are common to the super nodes and local nodes;

making and breaking the connections among the super nodes and the local nodes as the agents interact over a time period;

increasing and decreasing strengths of the connections among the super nodes and local nodes as a function of a change in the number of events that the super nodes and local nodes have in common;

periodically calculating an instability metric for the dynamic stochastic network; and detecting in proactive real time an emerging group threat behavior in real time based on a deviation from the instability metric;

wherein the emerging group threat behavior is detected in real time by computing a distance from an equilibrium vector of the stochastic network.

18. The computer readable storage device of claim 17, comprising instructions for periodically calculating an exponential moving average for the instability metric; and detecting the emerging group threat behavior by detecting a deviation from the exponential moving average of the instability metric.

19. The computer readable storage device of claim 17, comprising instructions for:

determining a configuration of the dynamic stochastic network; wherein the configuration comprises a number of agents that are active and a number of number of events and types of events with which the agents are associated;

determining durations of events with which the agents are associated; and determining connections of agents within the super nodes to other super nodes.

20. The computer readable storage device of claim 19, comprising instructions for:

computing a difference of a set of ordinary differential equations that approximates an empirical distribution of the dynamic stochastic network and that corresponds to a computed vector field;

determining a magnitude of the difference of the vector field;

determining that the dynamic stochastic network is stable when the computed vector field is close to zero;

determining that the dynamic stochastic network is unstable when the computed vector field trends away from zero and is greater than a threshold;

when the dynamic stochastic network is unstable, transmitting an alert reporting that the dynamic stochastic network is unstable; and determining a contribution of a particular agent to the instability of the dynamic stochastic network.

* * * * *

UNITED STATES PATENT AND TRADEMARK OFFICE
CERTIFICATE OF CORRECTION

PATENT NO. : 9,749,339 B2
APPLICATION NO. : 14/629795
DATED : August 29, 2017
INVENTOR(S) : Kadambe et al.

It is certified that error appears in the above-identified patent and that said Letters Patent is hereby corrected as shown below:

In the Specification

In Column 3, Line 14, delete "$\chi=\{(n_1, n_2, \ldots, n_K,)\}$." and insert --$\chi = \{n = (n_1, n_2, \cdots, n_K,)\}$.-- therefor In Column 3, Line 16-17, should read, --$X_{i,l}^N(t) = \{\lambda_{i,k,l}, \mu_{i,k,l}, [\gamma_{i,l,1}, \gamma_{i,l,2}, \cdots, \gamma_{i,l,N}]\}$-- therefor

In Column 3, Line 18, delete "µi,k,l" and insert --$\mu_{i,k,l}$-- therefor In Column 3, Line 37-38, delete "$Y^N(t)=\{Y_1^N(t), \ldots, Y_M^N(t)\}$." and insert
--$Y^N(t) = \{Y_1^N(t), Y_2^N(t), \cdots, Y_M^N(t)\}$-- therefor In Column 4, Line 5-10, delete "$\gamma^{il} = \frac{\text{number of interactions between supe node } i \text{ and } l}{\text{total number interactions among all active super nodes}}$." and insert
--$\gamma^{il} = \frac{\text{number of interactions between super node } i \text{ and } l}{\text{total number interactions among all active super nodes}}$.-- therefor In Column 5, Line 2, delete "ESI" and insert --$ESI_t$-- therefor Signed and Sealed this
Twenty-eighth Day of May, 2019

Andrei Iancu
*Director of the United States Patent and Trademark Office*